United States Patent
Hart et al.

(10) Patent No.: US 10,262,137 B1
(45) Date of Patent: Apr. 16, 2019

(54) SECURITY RECOMMENDATIONS BASED ON INCIDENTS OF MALWARE

(71) Applicant: Symantec Corporation, Mountain View, CA (US)

(72) Inventors: Michael Hart, Farmington, CT (US); Kevin Alejandro Roundy, El Segundo, CA (US); Shang-Tse Chen, Atlanta, GA (US); Christopher Gates, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 209 days.

(21) Appl. No.: 15/197,995

(22) Filed: Jun. 30, 2016

(51) Int. Cl.
*G06F 12/14* (2006.01)
*G06F 21/56* (2013.01)
*H04L 29/06* (2006.01)

(52) U.S. Cl.
CPC ........ *G06F 21/566* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2008/0120611 A1* | 5/2008 | Aaron | G06F 21/51 717/174 |
| 2010/0058313 A1* | 3/2010 | Hansmann | G06F 8/68 717/168 |
| 2010/0070965 A1* | 3/2010 | Britten | G06F 8/65 717/173 |
| 2011/0225575 A1* | 9/2011 | Ningombam | G06F 8/65 717/170 |
| 2012/0110174 A1* | 5/2012 | Wootton | G06F 21/564 709/224 |
| 2015/0163121 A1* | 6/2015 | Mahaffey | G06F 11/0766 707/687 |
| 2016/0012235 A1* | 1/2016 | Lee | G06Q 10/0635 726/25 |

* cited by examiner

*Primary Examiner* — Brandon S Hoffman
(74) *Attorney, Agent, or Firm* — Holland & Hart LLP

(57) ABSTRACT

A method for providing security recommendations is described. In one embodiment, the method may include identifying a set of monitored customers. In some cases, each monitored customer may include one or more computing devices. The method may include identifying a first computing device of a monitored customer for evaluation, selecting a potential security product to install on the first computing device, and quantifying the ability of the monitored customer to detect or prevent malware incidents based at least in part on the selected potential security product.

20 Claims, 8 Drawing Sheets

| Application | Type | Incident Count |
|---|---|---|
| Application A 335 | Endpoint Protection | 327 |
| Application B 340 | Firewall | 807 |
| Application C 345 | Endpoint Protection | 222 |
| Application D 350 | Device Control | 23 |
| Application E 355 | Data Loss Prevention | 67 |
| ... | ... | ... |
| Application N1 360 | Endpoint Protection | 119 |
| Application N2 365 | Firewall | 502 |

*FIG. 4*

SECURITY RECOMMENDATIONS BASED ON INCIDENTS OF MALWARE

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

However, the wide-spread use of computers has come with the increased cost and continued spread of computer viruses and malware. As computing devices and mobile computing devices become more ubiquitous throughout the world, malware creators are given an increased number of computer systems to infect. Nevertheless, benefits may be realized by providing systems and methods for improving malware detection.

SUMMARY

According to at least one embodiment, systems and methods for providing security recommendations are described. More specifically, systems and methods for providing recommendations of computer system security products based on incident rates of malware detection and/or prevention across one or more monitored machines are described. In one embodiment, the method may include identifying a set of monitored customers. In some cases, each monitored customer may include one or more computing devices. The method may include identifying a first computing device of a monitored customer for evaluation, selecting a potential security product to install on the first computing device, and quantifying the ability of the monitored customer to detect or prevent malware incidents based at least in part on the selected potential security product.

In some embodiments, the method may include identifying one or more computing devices that are similar in at least one aspect to the first computing device. In some cases, the method may include selecting a second computing device from the identified one or more computing devices based on the second computing device including a software application not installed on the first computing device. In some configurations, the software application may be identified for detecting malware incidents the first computing device fails to detect. In some embodiments, the method may include determining a number of malware incidents the software application of the second computing device detects that the first computing device fails to detect.

In some embodiments, the method may include identifying a customer response rate associated with the malware incidents detected by the software application of the second computing device. Based at least in part on the identified customer response associated with the malware incidents detected by the software application of the second computing device, the method may include estimating a likelihood adding the software application of the second computing device to the first computing device results in an increased customer response by the monitored customer of the first computing device.

In some embodiments, the method may include generating a list of software applications installed on the computing devices of the monitored customers. In some embodiments, the method may include ranking a performance of each software application on the list of software applications in relation to each software application performing security actions on the one or more computing device and recommending a software application from the list of software applications to one or more monitored customers based on the rank of the recommended software application.

In some embodiments, the method may include categorizing each monitored customer by any combination of industry, number of computing devices, computing device type, computing device operating system, operating system version, firmware, firmware version, software applications installed, and rate of malware incidents. In some cases, the computing device type may include at least one of a mobile computing device, a laptop, a tablet, a desktop, and a server.

A computing device configured for providing security recommendations is also described. The computing device may include a processor and memory in electronic communication with the processor. The memory may store computer executable instructions that when executed by the processor cause the processor to perform the steps of identifying a set of monitored customers. In some cases, each monitored customer may include one or more computing devices. In some cases, the memory may store computer executable instructions that when executed by the processor cause the processor to perform the steps of identifying a first computing device of a monitored customer for evaluation, selecting a potential security product to install on the first computing device, and quantifying the ability of the monitored customer to detect or prevent malware incidents based at least in part on the selected potential security product.

A non-transitory computer-readable storage medium storing computer executable instructions is also described. When the instructions are executed by a processor, the execution of the instructions may cause the processor to perform the steps of identifying a set of monitored customers. In some cases, each monitored customer may include one or more computing devices. In some cases, the storage medium may store computer executable instructions that when executed by the processor cause the processor to perform the steps of identifying a first computing device of a monitored customer for evaluation, selecting a potential security product to install on the first computing device, and quantifying the ability of the monitored customer to detect or prevent malware incidents based at least in part on the selected potential security product.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating one example of a malware incident table for providing security recommendations;

Figure 1:
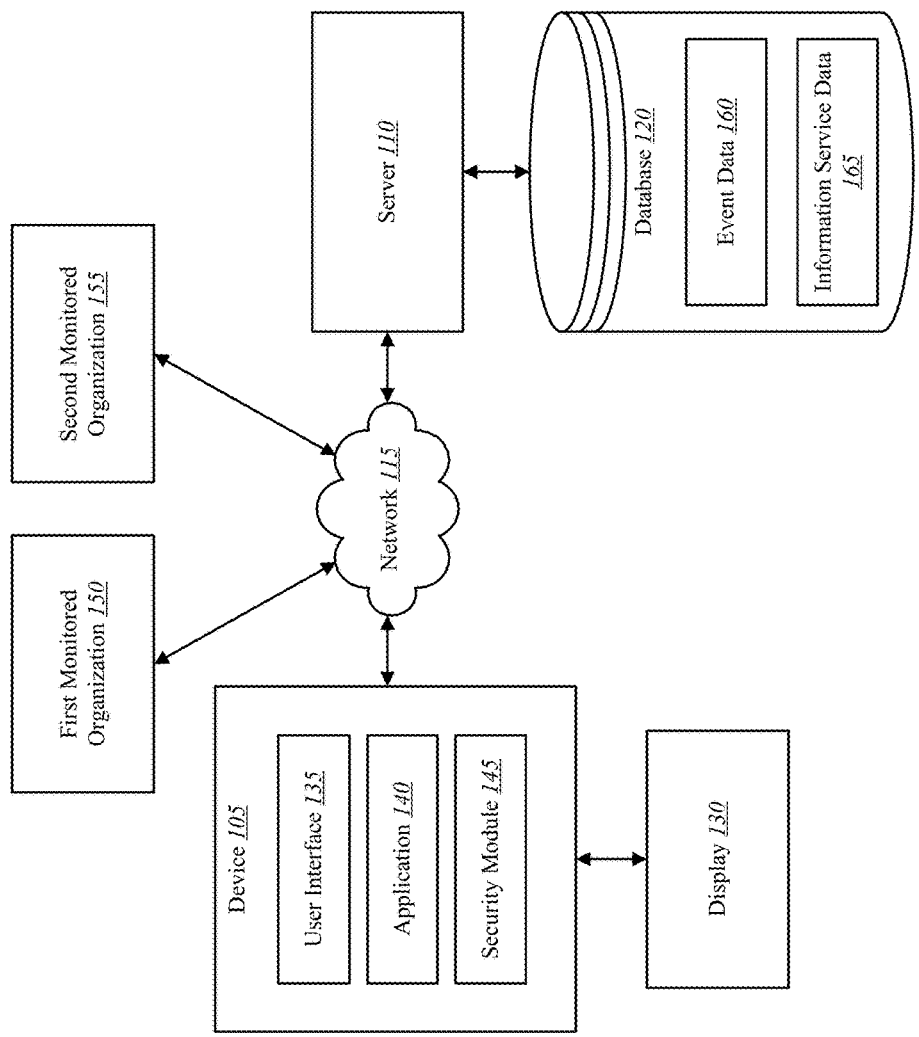
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to providing security recommendations. More specifically, the systems and methods described herein relate to providing security recommendations in relation to the incident rates of malware detections being monitored across multiple machines.

In some cases, an organization may outsource computer security to a third party. For example, an organization may use network and/or system security services such as managed security services (MSS). A company providing such a service may be referred to as a managed security service provider (MSSP). Businesses may turn to MSSPs to handle system security in relation to targeted malware, customer data theft, and/or resource management. Functions of a managed security service include round-the-clock monitoring and management of intrusion detection systems and firewalls, detecting malware, quarantining malware, blocking malware, preventing malware infections, overseeing patch management and upgrades, performing security assessments and security audits, and responding to malware incidents. This diverts the burden of performing the chores manually, which can be considerable, away from administrators.

As one example, an organization may implement a first security product from a first provider and a second security product from a second provider that is independent of the first provider. The security products may include hardware, firmware, software, or any combination thereof. The organization may then employ the first or second provider or even a third provider independent of the first or second provider to manage the first and second security products. For instance, the organization may implement endpoint protection software from entity A, a firewall from entity B, and entity C may manage the operation of both the endpoint protection software and firewall on behalf of the organization, monitoring and analyzing all events, incidents, and potential threats related to malware and machine-related security events in relation to one or more monitored machines of the organization.

Malware incidents may include virus incidents, traffic associated with a virus, ransomware incidents, spyware incidents, Trojan malware incidents, adware incidents, rootkit incidents, file reputation incidents, incidents involving a file only detected on low-reputation systems, incidents involving applications performing suspicious activity, malicious bot incidents, suspicious error incidents, denial of service incidents, worm incidents, and the like. In some cases, the present systems and methods may identify, track, quarantine, prevent, and block such events related to system security. In some cases, the potential security product may include any combination of hardware, firmware, and software products configured for computer security. For example, the potential security threat may include any combination of operating system patches, patches for installed software applications, firmware updates, anti-virus software, endpoint protection software, anti-spyware, anti-ransomware, anti-adware, rootkit detection software, etc. Additionally, or alternatively, the potential security product may include hardware security products that may include any combination of dongles such as universal serial bus (USB) dongles, trusted platform modules, hardware device authentication, hardware enclosure intrusion detection, storage drive locks, storage drive hardware based encryption, USB port control such as enabling and/or disabling select USB ports, and mobile device enabled access.

As one example, MSSP customers may make subjective and marketing-based decisions about what security products would improve their security. The customer may prefer empirical measurements that could quantify the extent to which deploying a new product could increase their ability to detect incidents and increase their ability to take action on reported incidents and recognize the actual threats. Currently, such data is not available to MSSP customers.

In some embodiments, the present systems and methods may leverage MSSP data to quantify the extent to which deploying a new product may increase a customer's ability to detect incidents and increase the customer's ability to take action on reported incidents and accurately identify actual threats. The present systems and methods may analyze incident creation and customer response-rate data to make recommendations regarding security products.

To enable customers to make informed decisions about which security product to purchase, the present systems and methods may provide metrics for a range of security products based on efficacy data obtained by an MSSP. In some embodiments, the present systems and methods may identify a security product that would contribute to the detection of the greatest number of additional incidents that are not already being detected by the customer. In some cases, the present systems and methods may identify products in addition to products already deployed by the customer. Additionally, or alternatively, the present systems and methods may identify recommended security products independent of any other products deployed or not deployed by the customer. In some embodiments, the present systems and methods may determine the extent to which additional context provided by a recommend product may contribute to an increased ability and likelihood of the customer to respond to incidents that are already being detected, but that would otherwise have been ignored for lack of evidence of a serious infection or lack of actionable information. In one embodiment, a list of the security products that are deployed in a customer's environment may be identified and analyzed in relation to the performance of each product. The performance of each product may be obtained via operations of an MS SP.

In one embodiment, a MSSP may provide security services for multiple customers. Some if not all of these customers may provide the MSSP telemetry data in relation to the security products deployed by the customer. The data collected by the MSSP may include malware incidents such as malware detection, malware preventions, and so forth, along with information as to whether a customer responds to a malware incident and/or a rate at which a customer responds to malware incidents in relation to the security products deployed by the particular customer.

In some embodiments, the present systems and methods may build a mapping of Event identifiers to product identifiers of the security products that produce those events. On the basis of this data, in some embodiments, the present systems and methods may measure the extent to which each individual security product detects/prevents malware and contributes context to security incidents. To infer the number of additional detections that a product p would generate beyond what a customer may detect with their currently deployed product suite, in some embodiments, the present systems and methods may identify the set of products that are deployed, and for each deployed product in this set, the present systems and methods may measure the fractions of incidents generated by p that would also have been detected by a deployed product. The fraction of incidents for which no additional products could provide detection may indicate the marginal value of adding p from the standpoint of increased incident detection. In some embodiments, the present systems and methods may measure the value of the additional context provided by p for its ability to increase incident response rates by studying the response rate of incidents in cases in which p is present to provide that context, as compared to cases in which it is not present. In particular, in measuring the impact of p's presence or absence on the response rate of incident instances, the present systems and methods may use information about what other products are present in each case. In some embodiments, the present systems and methods may build a model that forecasts the increase in incident resolution rate that p could provide for a particular context in which an existing set of products are already deployed. In some embodiments, the present systems and methods may repeat this analysis for all products that are not deployed by the customer, and that are not mutually exclusive with currently deployed products. For instance, the present systems and methods may prevent recommending multiple endpoint protection systems to the same customer.

In some embodiments, the present systems and methods may analyze not only how many new detections would have been contributed by adding product p, but also characterize those new detections by severity level. For example, the present systems and methods may determine that company A would have detect/prevent n more high severity incidents than are currently detected/prevented. In some embodiments, the present systems and methods may identify if the inclusion of another product would change the severity level of an incident. In some embodiments, the present systems and methods may analyze the impact on the response rate with respect to the severity level.

In the absence of contextual information about what security devices are deployed in a customer's security environment, and for customers that are either wiping the slate clean or are starting from scratch, the present systems and methods may recommend products using a similar methodology. For a customer starting from scratch with a budget of three products, for example, the present systems and methods may determine the best overall security product for this particular customer and recommend the best overall product as a first product. In some embodiments, the present systems and methods may use our methodology to identify the best complement to the first product and recommend this best complement as a second product. Similarly, the present systems and methods may identify a third product as a best complement to the first and second products and recommend the third product.

In some embodiments, the context of incidents detected by a first machine may be analyzed in relation to incidents detected by a second machine. In some embodiments, the first machine may be from a first organization and the second machine may be from a second organization unrelated to the first organization. Alternatively, in some cases, the first and second machines may be two machines from the same organization. The analysis may include comparison of software applications that are installed on the first and/or second machines, as well as software applications that are not installed on the first and/or second machines.

In some cases, the present systems and methods may analyze a correlation between malware signatures on a first machine and malware incident detection on the first machine in relation to a correlation between malware signatures on a second machine and malware incident detection on the second machine. For example, the first machine may include a first signature while the second machine includes the same first signature and a second signature. The present systems and methods may analyze the first and second signatures in relation to the malware incident detection on both the first and second machines. The analysis may indicate a context the second signature provides to malware detection in order to clarify one or more aspects of the malware such as a severity of detected malware. For instance, a malware incident may be identified as a high severity incident if the malware or potential malware is determined to present a more than likely chance of damaging data and/or system hardware, whereas a malware incident may be identified as a low severity incident if the malware or potential malware is determined to present a less than likely chance of damaging data and/or system hardware. Accordingly, as one example, the first signature on either the first or second machine may fail to detect a suspicious file, whereas the second signature on the second machine may identify the file as being suspicious, enabling the second machine to protect itself from the suspicious file. As another example, the first signature on either machine may detect the suspicious file. On the first machine, the detection of the suspicious event may result in the first machine identifying the suspicious file as an unknown file or a low severity malware file. Accordingly, the first machine may have to wait for further information or an update in order to properly classify the suspicious file. On the second machine, the second signature may provide additional context to the suspicious file. For instance, the second signature may indicate that the suspicious file is associated with a high severity incident. Accordingly, the context provided by the second signature may provide the second machine additional confidence in properly classifying the suspicious file.

In some embodiments, the present systems and methods may provide an indication of how many malware incidents the first machine would be detecting/preventing if the first machine included a software application that is on the second machine. In some cases, the present systems and methods may generate a report indicating the results of the analysis and send the results to an organization associated with the first machine to enable the organization to verify what improvements may be made to the first machine to increase the capabilities of the first machine in detecting malware incidents. In some embodiments, the results may indicate an increase in malware detection rates by making the suggested improvements such as indicating an increase in the amount of malware incidents detections, indicating an increase the number of notifications per malware incident, indicating an increase in contextual information per malware incident, indicating a likelihood of being able to identify an incident as malware or non-malicious, indicating a percentage by which malware detection may be improved, indicating an increase in the ability to properly classify suspicious files, or any combination thereof. In some cases, the report may indicate how certain software applications such as firewalls may block malware from entering the internal network of an organization. Additionally, or alternatively, the report may indicate software applications that may result in an increase in detectability of malware incidents, or software applications that, if installed, may provide detectability of malware incidents that would not otherwise have been detectable.

In some embodiments, the report may indicate software applications that would provide the customer with additional context and/or detail about a malware incident so that the customer is given sufficient notice regarding of the severity of the malware incident, enabling the customer to realize whether the malware incident merits a response by the customer. In some cases, the report may indicate that not installing the suggested software application may result in the customer not taking proper action due to lack of context and/or detail about a malware incident.

In some embodiments, the report may indicate that a first installed software application overlaps with a second installed software application. For example, the first and second installed software applications may both detect malware. However, the first installed software application may only find 9 out of every 10 malware incidents detected by the second installed software application. Accordingly, the report may indicate that the first installed software application overlaps with the second installed software application and that the second installed software application detects more malware incidents than the first installed software application, enabling the customer to determine whether to keep both first and second installed software applications or remove one of them. Similarly, the report may indicate that an increase of performance of malware detection by adding a particular software application may be relatively minimal due to overlap between the particular software application and an application already installed on the relative machine.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a first monitored organization 150, a second monitored organization 155, and a network 115 that allows the device 105, the server 110, the first monitored organization 150, and second monitored organization 155 to communicate with one another.

Examples of the device 105 may include any combination of mobile computing devices, smart phones, computer tablets, personal computing devices, laptops, desktops, servers, media content set top boxes, etc. Examples of the first and/or second monitored organizations 150 and 155 may include any organization that uses computer systems such as companies, corporations, hospitals, not for profit organizations, schools, universities, churches, government agencies, etc. Accordingly, examples of machines of the first and/or second monitored organizations 150 and 155 may include any combination of system control computing devices (e.g., wall-mounted controllers, etc.), personal computing devices (e.g., laptop, desktop, etc.), mobile computing devices (e.g., tablet computing device, smartphone, etc.), servers, and the like.

Examples of server 110 may include any combination of a data server, a cloud server, a server associated with a service provider, proxy server, mail server, web server, application server, database server, communications server, file server, home server, mobile server, name server, etc.

In some configurations, the device 105 may include a user interface 135, application 140, and security module 145. Although the components of the device 105 are depicted as being internal to the device 105, it is understood that one or more of the components may be external to the device 105 and connect to device 105 through wired and/or wireless connections. In some embodiments, application 140 may be installed on first and/or second monitored organizations 150 and 155 in order to allow a user to interface with a function of device 105, security module 145, second monitored organization 155, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a security module 145. For example, device 105 may include application 140 that allows device 105 to interface with second monitored organization 155 via security module 145 located on another device such as first monitored organization 150 and/or server 110. In some embodiments, device 105, first monitored organization 150, second monitored organization 155, and server 110 may include a security module 145 where at least a portion of the functions of security module 145 are performed separately and/or concurrently on any combination of device 105, first monitored organization 150, second monitored organization 155, and server 110. Likewise, in some embodiments, a user may access the functions of device 105 and/or second monitored organization 155 (directly or through device 105 via security module 145) from first monitored organization 150, as one example. For instance, in some embodiments, first monitored organization 150 may include a mobile application that interfaces with one or more functions of device 105, second monitored organization 155, security module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include event data 160 and information service data 165. For example, device 105 may access event data 160 in database 120 over network 115 via server 110. Event data 160 may include data regarding malware incidents such as malware detection, malware prevention, etc., of the first and/or second monitored organizations 150 and 155. For example, the first and/or second monitored organizations 150 and 155 may each include computer systems that use one or more security products to detect and/or prevent malware incidents. In some cases, event data 160 may include data regarding security products related to the malware detections/preventions. In some cases, security module 145 may analyze event data 160 to identify patterns between malware incidents and the security products that detect/prevent the malware incidents.

In some embodiments, information service data 165 may include data related to the analysis of the event data. In some embodiments, information service data 165 may include a mapping between security products and the malware incidents detected/prevented by particular security products. Additionally, or alternatively, information service data 165 may include a model derived from the analysis of the event data 160. Thus, in some embodiments, security module 145 may analyze event data 160 and generate a model based on the analysis. In some cases, the model may enable the security module 145 to recommend security products to a customer in relation to the configuration of a computer system belonging to the customer. For example, security module 145 may recommend a security product to the first and/or second monitored organizations 150 and 155 based on the model. Further details regarding the security module 145 are discussed below.

Figure 2:
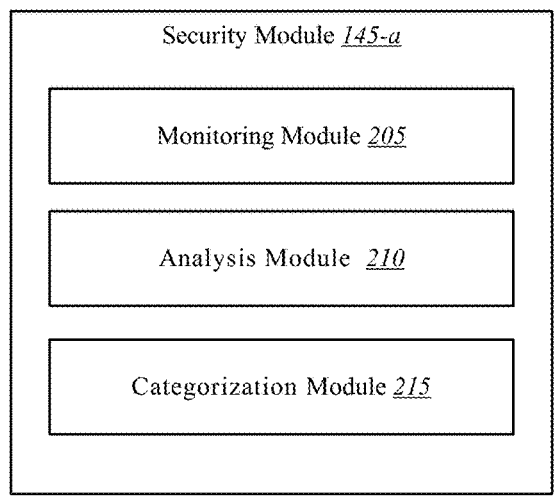
FIG. 2 is a block diagram illustrating one example of a security module.

FIG. 2 is a block diagram illustrating one example of a security module 145-*a*. Security module 145-*a* may be one example of security module 145 depicted in FIG. 1. As depicted, security module 145-*a* may include monitoring module 205, analysis module 210, and categorization module 215.

In one embodiment, monitoring module 205 may be configured to identify a set of monitored organizations. In some cases, each monitored organization may include one or more computing devices. For example, monitoring module 205 may be configured to monitor a first organization with one or more computing devices, monitor a second organization with one or more computing device, and so forth. In some embodiments, monitoring module 205 may be configured to monitor the computing devices of each monitored organization in relation to system security that include malicious threats to hardware, firmware, and/or software of monitored computing devices. For example, monitoring module 210 may monitor computing device for threats from any combination of malware such as viruses, ransomware, spyware, adware, malicious bots, rootkits, suspicious error events, denial of service attacks, Trojans, worms, and the like. In some cases, monitoring module 205 may identify and track such events related to system security.

In some embodiments, analysis module 210 may be configured to identify a first computing device of the first monitored organization for evaluation. In some cases, analysis module 210 may identify one or more computing devices for evaluation.

In some cases, analysis module 210 may identify the first computing device based on a request from the first monitored organization. Additionally, or alternatively, analysis module 210 may identify the first computing device for evaluation based at least in part on a result of monitoring module 205 monitoring the first computing device. For example, monitoring module 205 may identify a security deficiency in the first computing device based at least in part on monitoring the first computing device.

In some embodiments, analysis module 210 may be configured to select a potential security product to install on the first computing device. For example, multiple security products may be installed across the several computing devices monitored by monitoring module 205. Analysis module 210 may analyze the performance of the multiple security products and compare the performances of each monitored computer device in relation to the various security products installed on the monitored computer devices. Based on this analysis, analysis module 210 may identify the performance of individual security products as well as the performance of security products in relation to other security products installed on the same monitored computing device.

In some embodiments, analysis module 210 may be configured to quantify an ability of the first computing device to detect and/or prevent malware incidents. In some cases, analysis module 210 may quantify an ability of the first computing device to improve upon an existing rate of detection and/or preventions of malware incidents based at least in part on the selected potential security product being installed on the first computing device. In some embodiments, analysis module may select a product on the first and/or a second computing as a baseline product. The baseline product may include a number of malware detections and/or preventions achieved by the baseline product on the first and/or second computer devices. In some cases, analysis module 210 may determine whether using another product with the baseline product results in an increase in malware detection, an increase in malware incident prevention, and/or a decrease in malware infections. For example, analysis module 210 may determine whether using the baseline product with another product on the first computing device results in the first computing device preventing an additional number of malware incidents from reaching the first computing device compared to using the baseline product alone.

In some embodiments, analysis module 210 may quantify this ability of the first computing device based on an analysis of installing the selected potential security product independent of any other security product already installed on first computing device and/or potentially installed on first computing device. Additionally, or alternatively, analysis module 210 may quantify this ability in relation to another security product already installed on the first computing device and/or in relation to installing on the first computing device another potential security product along with the selected potential security product.

In some embodiments, analysis module 210 may be configured to identify one or more computing devices that are similar in at least one aspect to the first computing device. For example, analysis module 210 may identify aspects of the first computing device such as operating system, version of operating system, basic input output system (BIOS), BIOS version, installed software applications, installed security-based applications, processor, memory, storage, malware incident rates, etc. Accordingly, analysis module 210 may analyze installing the potential security product on the first computing device in relation to one or more computing devices with similar aspects, configuration, and/or performance.

In some embodiments, analysis module 210 may identify one or more computing devices based on identified similarities between monitored organizations. For example, in some embodiments, categorization module 215 may be configured to categorize each monitored organization by at least one of industry, number of computing devices, computing device type, computing device operating system, operating system version, firmware, firmware version, software applications installed, and rate of malware incidents. In some cases, the computing device type including at least one of a mobile computing device, a laptop, a tablet, a desktop, and a server. As one example, the first monitored organization may be in the banking industry and have 1000+ computing devices monitored by monitoring module 205 that include any combination of mobile computing devices, laptops, tablets, desktops, and servers. The computing devices of the first monitored organization may use any combination of the WINDOWS® operating system MAC-OS® operating system, LINUX® operating system, ANDROID® operating system, I-OS® operating system, and the like. The computing devices of the first monitored organization may include an endpoint protection software suite from provider A, a firewall from provider B, and include a relatively high rate of detected malware incidents. Likewise, a second monitored organization may be in the banking industry and employ computing devices in number and configuration similar to the first monitored organization. A third monitored organization may be in the automotive repair industry and have less than 10 computing devices monitored by monitoring module 205. Accordingly, analysis module 210 may identify the second monitored organization as being similar to the first monitored organization in at least one aspect, while identifying the third monitored organization as failing to have one or more aspects similar to the first monitored organization.

In some embodiments, analysis module 210 may be configured to select a second computing device from the identified one or more computing devices based on the second computing device including a software application not installed on the first computing device. In some cases, the software application not installed on the first computing device may be one example of the potential security product selected analyzed in relation to potentially installing the security product on the first computing device. In some cases, the second computing device may be selected by analysis module 210 based at least in part on the analysis module 210 determining the software application from the second computing device detects malware incidents the first computing device fails to detect.

In some embodiments, analysis module 210 may be configured to determine a number of malware incidents the software application of the second computing device detects that the first computing device fails to detect. In some cases, analysis module 210 may rank two or more malware incidents the first computing device fails to detect based on a severity of the malware incident. Analysis module 210 may determine the severity of a malware incident based on the level of damage presented by a particular item of malware. For example, analysis module 210 may assign certain malware with a high severity based on a likelihood of the malware to cause damage to data and/or hardware and assign other malware with a low severity based on a likelihood of the malware to cause little to no damage to data and/or hardware.

In some embodiments, analysis module 210 may identify similar malware incidents detected by both the first and second computing device. For example, analysis module 210 may compare the severity of a malware incident assigned by the first computing device with the severity of the same incident assigned by the software application of the second computing device. For instance, analysis module 210 may determine that the first computing device incorrectly assigns a high severity item of malware as having a low severity while the second computing device correctly assigns the same item of malware a high severity. In some cases, analysis module 210 may identify one or more aspects that enabled the second computing device to correctly determine the severity of the malware incident. For example, analysis module 210 may determine that any combination of hardware, firmware, and software on the second computing device led the second computing device to correctly determine the severity of the malware incident. As one example, analysis module 210 may determine that the software application installed on the second computing device and not installed on the first computing device led the second computing device to correctly determine the severity of the malware incident.

In some embodiments, analysis module 210 may be configured to identify a user response rate associated with the malware incidents detected by the software application of the second computing device. For example, analysis module 210 may determine that, compared to the first computing device, the configuration of the second computing device results in a higher rate of malware detection, a higher rate of correctly identifying the severity of malware incidents, and/or a higher user response rate. A user is more likely to respond to a high severity malware incident compared to the low severity malware incident. Thus, in some cases, a user's response rate may increase as a system increases its rate of correctly identifying malware incidents of high severity as well as correctly identifying malware incidents of low severity. Accordingly, when the first computing device incorrectly assigns a high severity malware incident as having a low severity, a user may ignore the notification due to the low severity classification. Conversely, when the second computing device correctly assigns a high severity to the malware incident, a user may be more likely to respond to a notification regarding the high severity malware incident.

In some embodiments, analysis module 210 may determine that a user response rate of the second computing device improves upon the user response rate of the first computing device due to the software application installed on the second computing device. Based at least in part on the identified user response associated with the malware incidents detected by the software application of the second computing device, in some embodiments, analysis module 210 may be configured to estimate a likelihood that adding the software application of the second computing device to the first computing device would result in an increased user response by a user of the first computing device.

In some embodiments, categorization module 215 may be configured to generate a list of software applications installed on the computing devices of the first monitored organizations. In some cases, categorization module 215 may generate a list of the software applications installed on every computing device of each monitored organization. In some cases, the categorization module 215 may deduplicate the list to remove duplicates of the same software application installed on two or more monitored computing devices.

In some embodiments, categorization module 215 may be configured to rank a performance of each software application on the list of software applications. In some cases, the rank of each software application may be based on independent operation of each software application in relation to detected security related events. For example, categorization module 215 may determine the performance of each software application in detecting malware incidents independent of any other software application. Additionally, or alternatively, categorization module 215 may determine the performance of each software application in relation to its performance in combination with one or more other software applications. For example, categorization module 215 may determine that a first endpoint protection software application performs better than a second endpoint protection software application. Accordingly, the categorization module 215 may rank the first endpoint protection software application above the second endpoint protection software application in a list of independent performances of each software application. Additionally, or alternatively, categorization module 215 may determine that the second endpoint protection software application paired with a certain firewall outperforms the first endpoint protection software application when paired with the same firewall. Accordingly, the categorization module 215 may rank the second endpoint protection software application above the first endpoint protection software application in a list of combinatorial performances of each software application.

In some embodiments, categorization module 215 may be configured to recommend a software application from the list of software applications to one or more monitored organizations based on the rank of the recommended software application. For example, categorization module 215 may determine that first endpoint protection software application outperforms all other endpoint protection software applications. Based on this determination, categorization module 215 may recommend a top-performing software application to a monitored organization. Similarly, categorization may determine that a computing device of a monitored organization implements a first software application and determine that the performance of this first software application would improve if the computing device also included a second software application based on a ranking of the combinatorial performance of the first software application in relation to the second software application.

Figure 3:
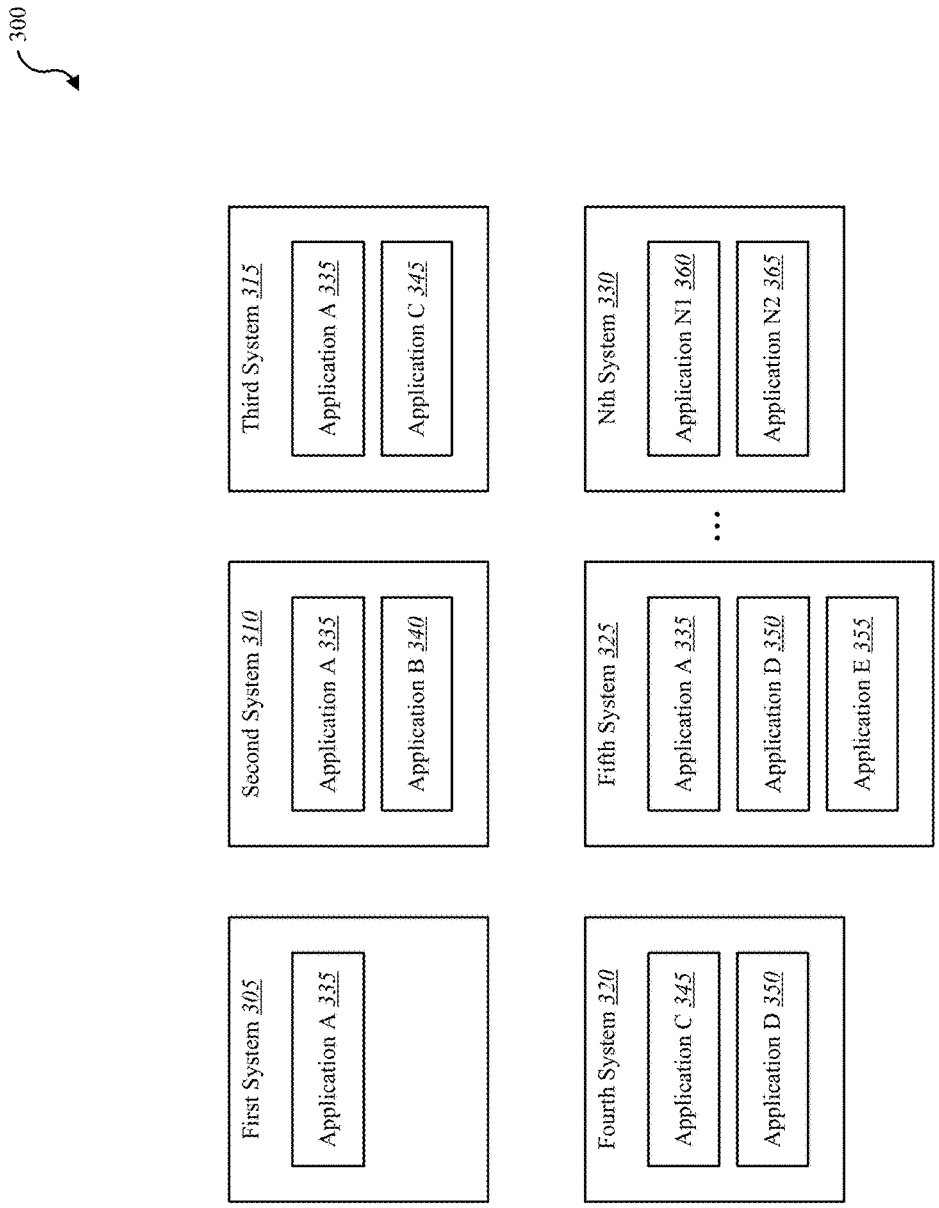
FIG. 3 is a block diagram illustrating one example of an environment for providing security recommendations.

FIG. 3 is a block diagram illustrating one example of an environment 300 for providing security recommendations. As depicted, environment 300 may include first system 305, second system 310, third system 315, fourth system 320, fifth system 325, and Nth system 330. In some embodiments, the systems illustrated may be examples of device 105 and/or server 110 of FIG. 1. Additionally, or alternatively, one or more of the illustrated systems may be examples of first monitored organization 150 and/or second monitored organization 155 of FIG. 1. The illustrated systems may include any combination of computer systems of the same organization and/or systems of different organizations independent of one another. For example, each illustrated system may belong to the same organization in one embodiment. Alternatively, at least one of the illustrated systems may be belong to a first organization and at least one of the illustrated systems may belong to a second organization independent of the first organization.

As shown, each system may include one or more applications. The included applications of each system may be installed on the respective systems. For example, first system 305 may include application A 335. Similarly, second system 310, third system 315, and fifth system 325 may include a copy of application A 335 installed on the respective systems. In some embodiments, one or more of the illustrated applications such application A 335, application B 340, application C 345, application D 350, application E 355, application N1 360, application N2 365, etc., may be examples of application 140 of FIG. 1.

In one embodiment, security module 145 may monitor the performance of each application installed on the respective systems. Security module 145 may identify malware detections and malware preventions in relation to the security products that detected and prevented the malware incidents. In some cases, security module 145 may make a recommendation to one of the illustrated systems based on the analysis of the monitored performance. For example, security module 145 may determine that second system 310 with the combination of both application A 335 and application B 340 improves malware detection and/or prevention by a certain amount of detections/preventions over application A 335 alone. Accordingly, in some embodiments, security module 145 may make a recommendation for first system 305 to install application B 340.

FIG. 4 is a block diagram illustrating one example of a malware incident table 400 for providing security recommendations. In one embodiment, the malware incident table 400 may include a mapping between security products and a malware incident indicator such as a malware incident count or malware incident rate.

As depicted, the malware incident table 400 may identify a security product such as application A 335, application B 340, application C 345, application D 350, application E 355, application N1 360, and application N2 365. In some cases, the malware incident table 400 may identify a type of application such as application A 335 is identified as an endpoint protection type of application, application B 340 is identified as a firewall type of application, etc. In some cases, the malware incident table 400 may identify a malware incident indicator such as an incident count, as illustrated. The incident count may identify a number of malware detections and/or preventions made by the respective security product. For example, application A 335 may be identified as having an incident count of 327, application B 340 having an incident count of 807, application C 345 having an incident count of 222, application D 350 having an incident count of 23, application E 335 having an incident count of 67, and so on.

In one embodiment, security module 145 may generate the illustrated malware incident table 400. In some cases, security module 145 may compare the performance of one security product to another security product. In some cases, security module 145 may compare security products based on the type of security product. For example, security module 145 may determine that application A 335 is of the same type as application C 345, that both are of the type endpoint protection. Accordingly, security module 145 may determine that application A 335 with 327 detected/prevented incidents outperforms application C 345 with 222 detected/prevented incidents. Thus, security module 145 may recommend a computer system with application C 345 to switch to application A 340. In some cases, security module 145 may compare the performance of a combination of security products to the performance of one or more security products. For example, security module 145 may compare the performance of a first system with the endpoint protection of application A 335 and firewall of application B 340 with the performance of a second system also with the endpoint protection of application A 335, but with the firewall of application N2 365 to determine which combination performs best. Based on the results of the comparison, security module 145 may make a recommendation for a customer to remove, add, and/or replace certain security products.

Figure 5:
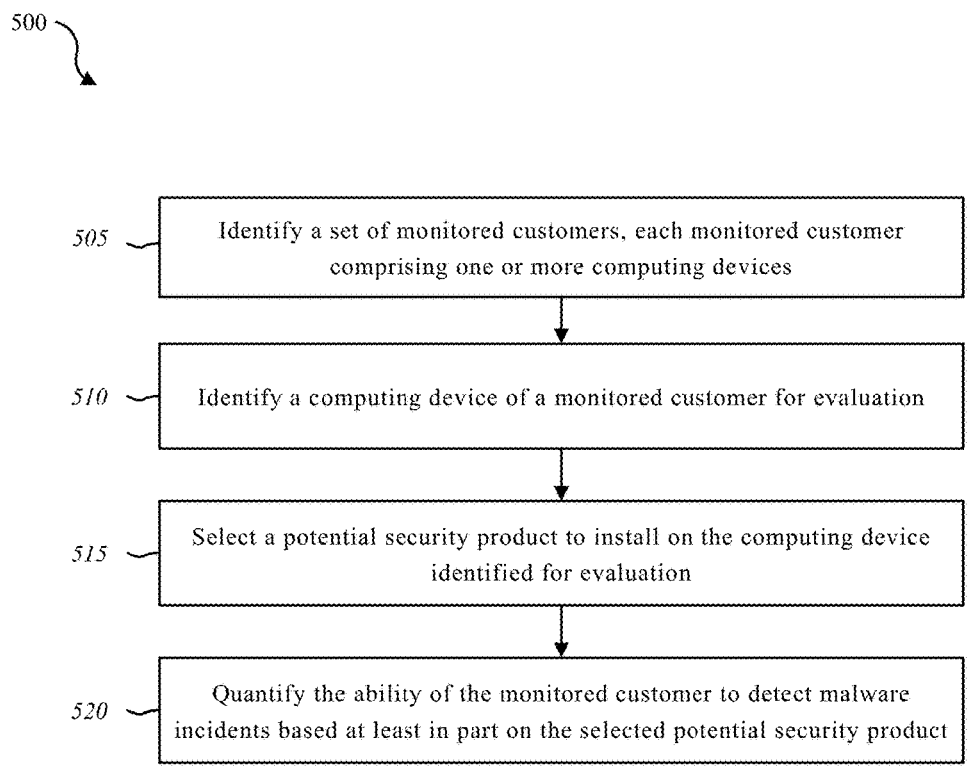
FIG. 5 is a flow diagram illustrating one embodiment of a method for providing security recommendations.

FIG. 5 is a flow diagram illustrating one embodiment of a method 500 for providing security recommendations. In some configurations, the method 500 may be implemented by the security module 145 illustrated in FIGS. 1 and/or 2. In some configurations, the method 500 may be implemented in conjunction with the application 140 and/or the user interface 135 illustrated in FIG. 1.

At block 505, method 500 may include identifying a set of monitored customers. In some cases, method 500 monitoring a customer may include monitoring of one or more computing devices of the customer. At block 510, method 500 may include identifying a computing device of a monitored customer for evaluation. At block 515, method 500 may include selecting a potential security product to install on the computing device identified for evaluation. In some cases, the potential security product may include any combination of hardware, firmware, and software products configured for computer security. At block 520, method 500 may include quantifying the ability of the monitored customer to detect or prevent malware incidents based at least in part on the selected potential security product.

Figure 6:
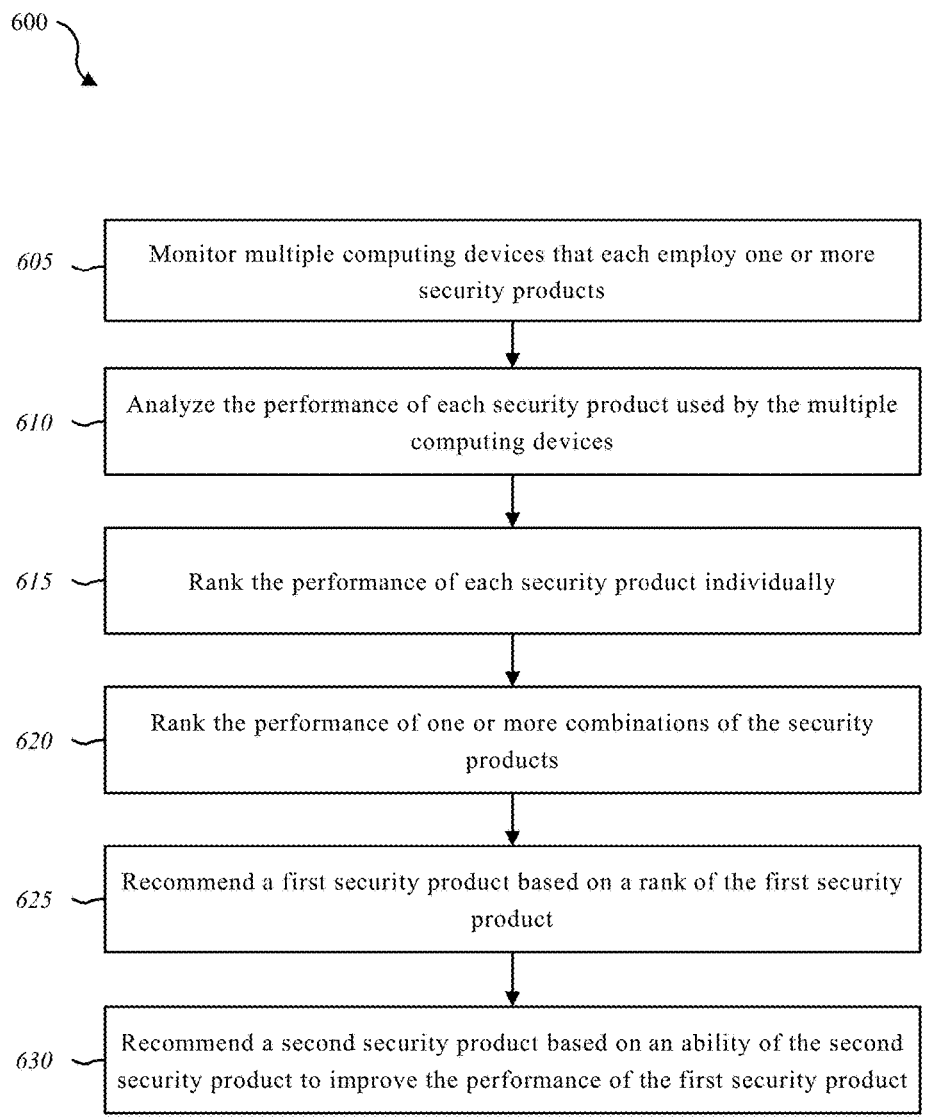
FIG. 6 is a flow diagram illustrating one embodiment of a method for providing security recommendations.

FIG. 6 is a flow diagram illustrating one embodiment of a method 600 for providing security recommendations. In some configurations, the method 600 may be implemented by the security module 145 illustrated in FIG. 1 or 2. In some configurations, the method 600 may be implemented in conjunction with the application 140 and/or the user interface 135 illustrated in FIG. 1.

At block 605, method 600 may include monitoring multiple computing devices that employ one or more security products each. The security products may include any combination of hardware, firmware, and software computer system security products. At block 610, method 600 may include analyzing the performance of each security product used by the multiple computing devices. At block 615, method 600 may include ranking the performance of each security product individually. For example, method 600 may include ranking the performance of each security product in terms of a rate of malware detection and/or a rate of prevention of malware infections. At block 620, method 600 may include ranking the performance of one or more combinations of security products. Likewise, method 600 may include ranking the performance of two or more security products together in relation to malware detection and/or prevention of malware. At block 625, method 600 may include recommending a first security product based on a rank of the first security product. At block 630, method 600 may include recommending a second security product based on an ability of the second security product to improve the performance of the first security product.

Figure 7:
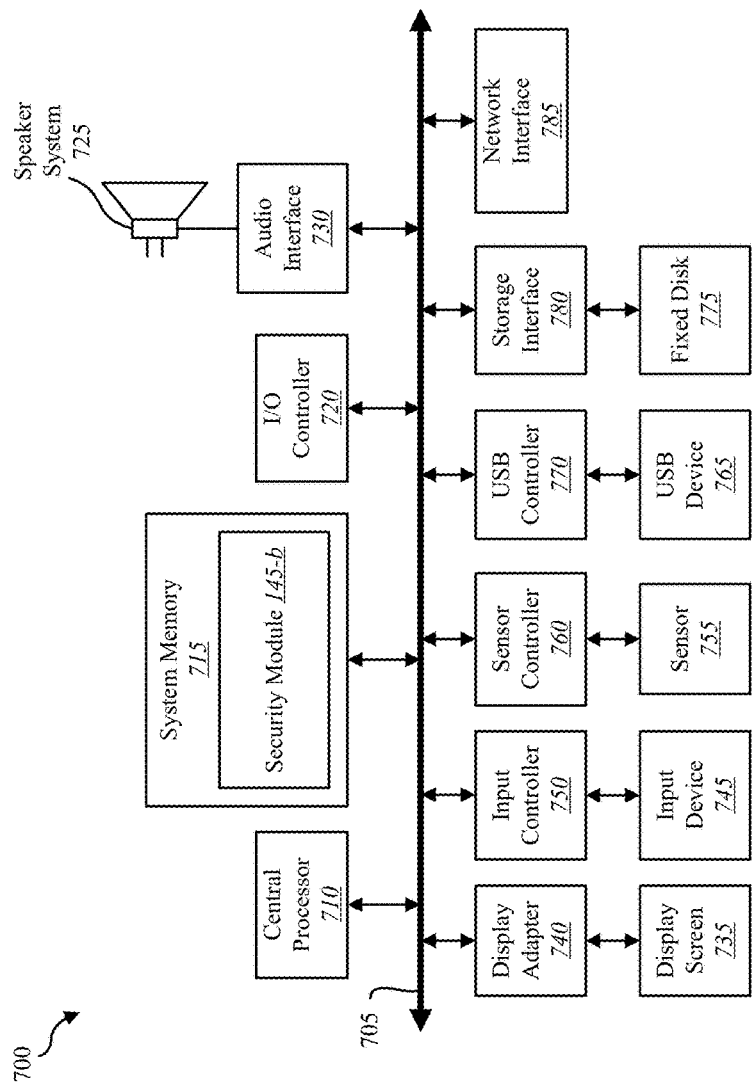
FIG. 7 depicts a block diagram of a computer system suitable for implementing the present systems and methods.

FIG. 7 depicts a block diagram of a computing device 700 suitable for implementing the present systems and methods. The device 700 may be an example of device 105, first monitored organization 150, second monitored organization 155 and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the security module 145-b to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable system 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

Figure 8:
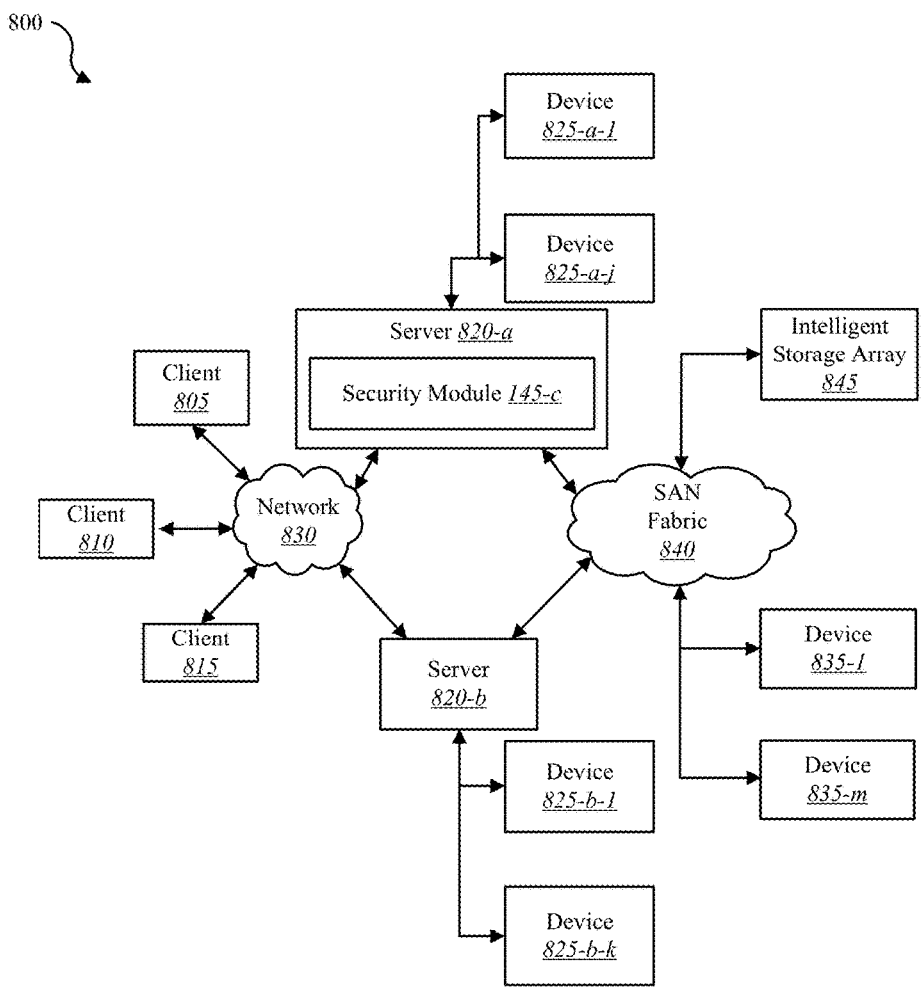
FIG. 8 depicts a block diagram of a computer system suitable for implementing the present systems and methods.

FIG. 8 is a block diagram depicting a network architecture 800 in which client systems 805, 810 and 815, as well as storage servers 820-*a* and 820-*b* (any of which can be implemented using computer system 700), are coupled to a network 830. In one embodiment, security module 145-*c* may be located within one of the storage servers 820-*a*, 820-*b* to implement the present systems and methods. Security module 145-*c* may be one example of security module 145 depicted in FIGS. 1, 2, and/or 7. The storage server 820-*a* is further depicted as having storage devices 825-*a*-*l* through 825-*a*-*j* directly attached, and storage server 820-*b* is depicted with storage devices 825-*b*-*l* through 825-*b*-*k* directly attached. SAN fabric 840 supports access to storage devices 835-1 through 835-*m* by storage servers 820-*a* and 820-*b*, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810 and 815 to network 830. Client systems 805, 810 and 815 are able to access information on storage server 820-*a* or 820-*b* using, for example, a web browser or other client software (not shown). Such a client allows client systems 805, 810 and 815 to access data hosted by storage server 820-*a* or 820-*b* or one of storage devices 825-*a*-*l* to 825-*a*-*j*, 825-*b*-*l* to 825-*b*-*k*, 835-1 to 835-*m* or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. It should be appreciated that these are not exhaustive lists of the types of security actions which may be performed by the systems described herein. Other security actions are also included in this disclosure.

What is claimed is:

1. A method for providing security recommendations of computer system security products in relation to previously installed security products across monitored machines, comprising:

identifying a set of monitored customers, each monitored customer comprising one or more computing devices;

identifying a first computing device of a first monitored customer for evaluation, the first monitored customer being one of the set of monitored customers;

selecting a first security product to potentially install on the first computing device; and quantifying the ability of the first monitored customer to detect or prevent malware incidents based at least in part on the selected first security product and a second security product previously installed on the first computing device, wherein the second security product is independent from the selected first security product.

2. The method of claim 1, comprising:
identifying one or more computing device that are similar in at least one aspect to the first computing device.

3. The method of claim 2, comprising:
selecting a second computing device from the identified one or more computing devices based on the second computing device including a software application not installed on the first computing device, the software application identified as detecting malware incidents the first computing device fails to detect.

4. The method of claim 3, comprising:
determining a number of malware incidents the software application of the second computing device detects that the first computing device fails to detect.

5. The method of claim 3, comprising:
identifying a customer response rate associated with the malware incidents detected by the software application of the second computing device.

6. The method of claim 5, comprising:
estimating, based at least in part on the identified customer response associated with the malware incidents detected by the software application of the second computing device, a likelihood adding the software application of the second computing device to the first computing device results in an increased customer response by the monitored customer of the first computing device.

7. The method of claim 1, comprising:
generating a list of software applications installed on the computing devices of the monitored customers.

8. The method of claim 7, comprising:
ranking a performance of each software application on the list of software applications in relation to each software application performing security actions on the one or more computing device; and
recommending a software application from the list of software applications to one or more monitored customers based on the rank of the recommended software application.

9. The method of claim 1, comprising:
categorizing each monitored customer by at least one of industry, number of computing devices, computing device type, computing device operating system, operating system version, firmware, firmware version, software applications installed, and rate of malware incidents.

10. The method of claim 9, the computing device type including at least one of a mobile computing device, a laptop, a tablet, a desktop, and a server.

11. A computing device configured for providing security recommendations of computer system security products in relation to previously installed security products across monitored machines, comprising:
a processor;
memory in electronic communication with the processor, wherein the memory stores computer executable instructions that when executed by the processor cause the processor to perform the steps of:
identifying a set of monitored customers, each monitored customer comprising one or more computing devices;
identifying a first computing device of a first monitored customer for evaluation, the first monitored customer being one of the set of monitored customers;
selecting a first security product to potentially install on the first computing device; and
quantifying the ability of the first monitored customer to detect or prevent malware incidents based at least in part on the selected first security product and a second security product previously installed on the first computing device, wherein the second security product is independent from the selected first security product.

12. The computing device of claim 11, wherein the instructions executed by the processor cause the processor to perform the steps of:
identifying one or more computing device that are similar in at least one aspect to the first computing device.

13. The computing device of claim 12, wherein the instructions executed by the processor cause the processor to perform the steps of:
selecting a second computing device from the identified one or more computing devices based on the second computing device including a software application not installed on the first computing device, the software application identified as detecting malware incidents the first computing device fails to detect.

14. The computing device of claim 13, wherein the instructions executed by the processor cause the processor to perform the steps of:
determining a number of malware incidents the software application of the second computing device detects that the first computing device fails to detect.

15. The computing device of claim 13, wherein the instructions executed by the processor cause the processor to perform the steps of:
identifying a customer response rate associated with the malware incidents detected by the software application of the second computing device.

16. The computing device of claim 15, wherein the instructions executed by the processor cause the processor to perform the steps of:
estimating, based at least in part on the identified customer response associated with the malware incidents detected by the software application of the second computing device, a likelihood adding the software application of the second computing device to the first computing device results in an increased customer response by the monitored customer of the first computing device.

17. The computing device of claim 11, wherein the instructions executed by the processor cause the processor to perform the steps of:
generating a list of software applications installed on the computing devices of the monitored customers.

18. The computing device of claim 11, wherein the instructions executed by the processor cause the processor to perform the steps of:
ranking a performance of each software application on the list of software applications in relation to each software application performing security actions on the one or more computing device; and
recommending a software application from the list of software applications to one or more monitored customers based on the rank of the recommended software application.

19. A non-transitory computer-readable storage medium storing computer executable instructions for providing security recommendations of computer system security products in relation to previously installed security products across monitored machines, that when executed by a processor cause the processor to perform the steps of:

identifying a set of monitored customers, each monitored customer comprising one or more computing devices;

identifying a first computing device of a first monitored customer for evaluation, the first monitored customer being one of the set of monitored customers;

selecting a first security product to potentially install on the first computing device; and quantifying the ability of the first monitored customer to detect or prevent malware incidents based at least in part on the selected first security product and a second security product previously installed on the first computing device, wherein the second security product is independent from the selected first security product.

20. The computer-program product of claim 19, wherein the instructions executed by the processor cause the processor to perform the steps of:

identifying one or more computing device that are similar in at least one aspect to the first computing device.

\* \* \* \* \*